Feb. 23, 1937.  G. B. SCHEIBELL  2,071,952
SOUND FILM APPARATUS
Filed March 12, 1931
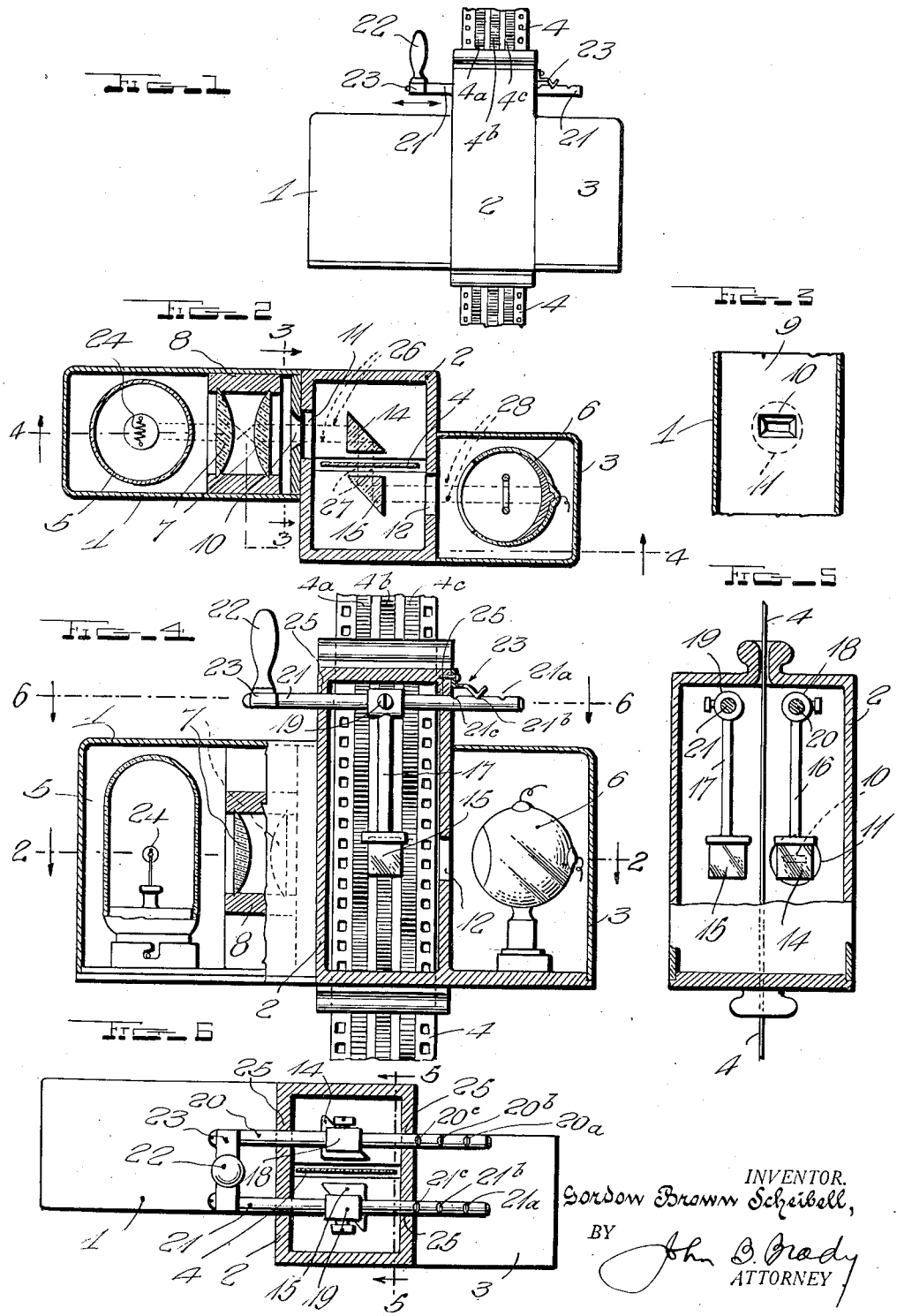
INVENTOR.
Gordon Brown Scheibell,
BY John B. Grady
ATTORNEY Patented Feb. 23, 1937

2,071,952

UNITED STATES PATENT OFFICE 2,071,952

SOUND FILM APPARATUS

Gordon Brown Scheibell, Newark, N. J.

Application March 12, 1931, Serial No. 522,092

12 Claims. (Cl. 179—100.3)

My invention relates broadly to sound film apparatus and more particularly to means for directing a beam of light through a sound film to a photosensitive cell.

My present invention provides a light source and a film having a multiplicity of sound tracks thereon associated with a photosensitive cell and means for directing a beam of light through a selected one of the sound tracks.

In reproducing sound from sound records on film by means of light directed through the film to a photosensitive cell, it is essential that the light beam be of constant basic intensity, the only variations being those produced by the records on the film. The use of a photographic film having a plurality of sound tracks thereon presents a difficult problem in preventing variations of the intensity of the light beam other than those produced by the sound track. In multiple sound track systems now known in the art, it is customary to provide a light source and photosensitive cell disposed upon opposite sides of the multiple sound track film with a shutter for directing a light beam through a selected sound track to the photosensitive cell. This provides an undesirable change in the basic intensity of the light inasmuch as light beams defined at random at different positions with respect to a light source comprise light rays which traverse different distances from the light source. At the same time, any movement of a light beam over a photosensitive cathode will produce a change in the photoelectric current, which is also very undesirable.

My invention further provides a method for directing a beam of light through any selected portion on a film to a photosensitive cell without change in the basic intensity of the light beam.

My invention also provides means for directing a beam of light through a plurality of different portions of film to a photosensitive cell without altering the angle of incidence of the beam of light with the photosensitive cathode of the cell.

The principles of my invention will be understood from the specification hereinafter following by reference to the accompanying drawing, in which:

Figure 1 is an elevational view showing the sound film apparatus of my invention; Fig. 2 is a horizontal sectional view along the line 2—2 of Fig. 4; Fig. 3 is a vertical sectional view through the sound film apparatus on line 3—3 of Fig. 2; Fig. 4 is a vertical sectional view through the sound film apparatus on line 4—4 of Fig. 2; Fig. 5 is a vertical sectional view through the film housing in the apparatus of my invention taken on line 5—5 of Fig. 6; and Fig. 6 is a horizontal sectional view of the sound film apparatus taken on line 6—6 of Fig. 4.

Referring to the drawing in detail, the sound film apparatus of my invention is constituted by a group of related housings positioned adjacent the sound film, the housing being indicated by reference characters 1, 2 and 3. The sound film is represented at 4 as passing vertically through the central housing 2. The sound film 4 has a multiplicity of sound tracks thereon shown at 4a, 4b and 4c. These sound tracks may be selectively and independently utilized to issue the operation of a light sensitive cell system as will be hereinafter described in detail. It will be observed that the film 4 passes through the film apparatus with the film apparatus projecting on opposite sides of the film in opposite directions. The apparatus projects forth, however, in directions coincident with the plane of the film strip 4 as can be seen more clearly in Fig. 2. The projection to the left of the film apparatus constitutes a housing for a light source indicated at 5. The projection at the right of the film constitutes a housing for a light sensitive cell 6. The housing 1 contains a mounting 8 which serves to support a condensing lens system 7 for directing light from the incandescent filament 24 of the light source 5 through the light slit 10 and aperture 11 into the film housing 2. The condensing lens system 7 is arranged to have a short focus for orienting the light rays from the point filament 24 of the lamp 5 into parallel rays indicated at 26. I provide an aperture 12 in the opposite side of the film housing 2 through which light rays are directed upon photoelectric cell 6. A carriage constituted by a pair of parallel extending slidable shaft members 20 and 21 are slidably mounted in aligned apertures 25 in opposite sides of the film housing 2. The slidable shaft members 20 and 21 are interconnected by a bridge member 23 to which there is secured a hand grip 22. The shaft members 20 and 21 are notched at 20a, 20b and 20c, and at 21a, 21b and 21c, as shown in Fig. 6, to receive the spring detents 23 which are adapted to latch into any one of the notches as the carriage is shifted through the film housing by gripping the handle 22. The shaft members 20 and 21 are each provided with adjustable socket members 18 and 19 which are concentrically positioned thereon and carry depending rod members 16 and 17 which form supports for prisms 14 and 15 respectively as shown. The prisms 14 and 15 serve to direct the light from the light source 5 to the photoelectric cell 6 through any one of the sound tracks 4a, 4b, or 4c on the sound film 4.

As shown in the drawing, the prisms 14 and 15 are aligned with the sound track 4b so that the light rays received from the light source 5 through slit 10 and aperture 11 strike prism 14 as indicated at 26 and are totally reflected and refracted as indicated at 27, thus passing through the sound channel 4b to prism 15 where the light is again totally reflected in the direction 28 through aperture 21 and upon photosensitive cell 6. When the prism support is moved by shifting handle 22 to another detent position, the light rays may be directed exclusively through sound channel 4a or through sound channel 4c. The light rays are selectively shifted from one sound track to another and maintained in the selected position by the interlock of the detents in any one of the notches in the shaft members 20 and 21 as heretofore described.

Hence it will be seen that by this construction accurate alignment of the prisms and the various sound tracks of the film is assured.

The film 4 extends in a parallel plane with the light path axes of the light source 5 and the photoelectric cell 6. Heretofore, it has been customary to operate the film strip directly between the light source and the light sensitive cell, but in the system of my invention I arrange the film strip in a plane which is parallel to planes including the path of light rays extending from the light source and incident upon the light sensitive cell.

It will be apparent that the illumination intensity of the light beam incident upon the photosensitive cell will always be constant, except for the variations produced by the sound tracks on the film. That is, the distance traversed by the light beam from the source of light to the photosensitive cell will remain unchanged as the prisms are moved transversely with respect to the film. It will also be apparent, that the angle of incidence of the light beam with the cathode of the photosensitive cell remains unchanged as the prisms are moved. This is an especial advantage.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. Film apparatus comprising a source of light, a photosensitive cell, a film, means for defining said light into a beam, and means for reflecting said light beam through said film, said last mentioned means being movable with respect to said cell.

2. Film apparatus comprising a film, a source of light, a photosensitive cell, a light reflector positioned on one side of said film for reflecting said light from said light source through said film, a second light reflector positioned on the other side of said film for reflecting light from said first mentioned reflector to said photosensitive cell, said reflectors being movable with respect to said cell.

3. Film apparatus comprising a film having a plurality of sound tracks longitudinally disposed thereon, a source of light, means for defining said light into a beam substantially the width of one of said sound tracks, and means for reflecting said beam of light through a selected one of said sound tracks, said means being movable with respect to said source of light.

4. The combination of a source of light, means for defining said light into a beam, a film, a photosensitive cell, and means for directing said light beam to said cell through any one of a plurality of different portions of said film without substantially altering the angle of incidence of said light beam with said photosensitive cell, said last mentioned means being movable with respect to said photo cell.

5. The combination of a source of light, means for defining said light into a beam, a photosensitive cell, and optical means for directing said beam of light to said cell over a predetermined path, said means being adapted to move said beam with respect to said cell in a manner which will not alter the distance traversed by said beam on said path.

6. The combination of a source of light, means for defining said light into a beam, a photosensitive cell, and optical means for directing said beam of light to said cell, said means being adapted to move said beam of light with respect to said cell without altering the angle of incidence of said beam of light upon said photosensitive cell.

7. Film apparatus comprising a multiplicity of interconnected chambers, a film strip extending through one of said chambers, a light source disposed in one of the chambers adjacent said first mentioned chamber, a light sensitive cell disposed in another of the chambers adjacent said first mentioned chamber, and means for directing light rays from said light source to said light sensitive cell through said chambers in a path, the major dimension of which extends parallel to the plane of said film strip, said means being movable in said chambers.

8. Film apparatus comprising a film strip, a light source, a light sensitive cell, and means for directing light rays from said light source upon said light sensitive cell in a path, the major dimension of which extends parallel to said film strip, said means being movable with respect to said cell.

9. A film apparatus comprising a plurality of film sound tracks, means for producing light for said sound tracks, a photosensitive cell, and reflective means movable with respect to said photocell for directing light from a selected one of said sound tracks to said cell.

10. A film apparatus comprising a plurality of film recorded sound tracks, stationary means for producing light rays, photosensitive means, and reflective means for directing light rays from a selected one of said sound tracks to said photosensitive means.

11. A film apparatus comprising a plurality of film recorded sound tracks, stationary means for producing light rays, a photosensitive cell, and movable reflective means for directing light from any selected one of said sound tracks to the same area of said photosensitive cell.

12. Film apparatus comprising a central film housing, a housing for a light source adjacent one side of said central film housing, a housing for a light sensitive cell adjacent the other side of said film housing, a film strip extending through said film housing in a plane parallel with the longitudinal axes of the housings at each side of said film housing, and means for bending the light rays from one of said housings through said film strip and directing the light rays upon said light sensitive cell comprising a pair of prisms and a bifurcated carriage slidable to selected positions through the upper portion of said film housing for supporting said prisms on opposite sides of said film strip in the path of the light rays passing through said housings.

GORDON BROWN SCHEIBELL.